(12) United States Patent
Wong

(10) Patent No.: US 8,701,193 B1
(45) Date of Patent: *Apr. 15, 2014

(54) MALWARE DETECTION VIA SIGNATURE INDICES

(75) Inventor: Steven Thomas Wong, Cerritos, CA (US)

(73) Assignee: EMC Corporation, Hopkinton, MA (US)

( * ) Notice: Subject to any disclaimer, the term of this patent is extended or adjusted under 35 U.S.C. 154(b) by 404 days.

This patent is subject to a terminal disclaimer.

(21) Appl. No.: 12/571,424

(22) Filed: Sep. 30, 2009

(51) Int. Cl.
*G06F 21/00* (2013.01)

(52) U.S. Cl.
USPC .............. 726/24; 726/22; 726/23; 713/189; 713/190; 713/191; 713/192; 713/193; 713/194

(58) Field of Classification Search
USPC .......................................................... 726/24
See application file for complete search history.

(56) References Cited

U.S. PATENT DOCUMENTS

| | | | |
|---|---|---|---|
| 4,939,748 A | 7/1990 | Betts et al. | |
| 5,218,605 A | 6/1993 | Low et al. | |
| 5,778,395 A | 7/1998 | Whiting et al. | |
| 5,917,421 A | 6/1999 | Saunders | |
| 7,694,119 B1 | 4/2010 | Scharland et al. | |
| 7,752,667 B2 * | 7/2010 | Challener et al. | 726/24 |
| 7,797,279 B1 | 9/2010 | Starling et al. | |
| 8,020,209 B2 | 9/2011 | Kester et al. | |
| 8,280,895 B2 | 10/2012 | Peckham et al. | |
| 2004/0039980 A1 | 2/2004 | Zak et al. | |
| 2004/0127196 A1 | 7/2004 | Dabbish et al. | |
| 2005/0015466 A1 * | 1/2005 | Tripp | 709/219 |
| 2005/0131900 A1 | 6/2005 | Palliyll et al. | |
| 2006/0143713 A1 | 6/2006 | Challener et al. | |
| 2006/0149806 A1 | 7/2006 | Scott et al. | |
| 2007/0028302 A1 | 2/2007 | Brennan et al. | |
| 2007/0150948 A1 | 6/2007 | De Spiegeleer | |
| 2007/0174911 A1 | 7/2007 | Kronenberg et al. | |
| 2007/0244877 A1 | 10/2007 | Kempka | |
| 2008/0148403 A1 | 6/2008 | Manion et al. | |
| 2009/0019547 A1 | 1/2009 | Palliyil et al. | |
| 2009/0259667 A1 | 10/2009 | Wang et al. | |
| 2009/0271454 A1 * | 10/2009 | Anglin et al. | 707/204 |
| 2010/0262797 A1 | 10/2010 | Rosikiewicz et al. | |

* cited by examiner

*Primary Examiner* — Ghazal Shehni

(74) *Attorney, Agent, or Firm* — Theodore A. Chen; Krishnendu Gupta

(57) ABSTRACT

A method, article of manufacture, and apparatus for efficiently processing information are disclosed. In some embodiments, a first signature index is received. The first signature index is compared to a second signature index. A negative signature match is based on the comparison. A file is flagged based on the negative match.

6 Claims, 5 Drawing Sheets

MALWARE DETECTION VIA SIGNATURE INDICES

CROSS-REFERENCE TO RELATED APPLICATIONS

This application is related to U.S. patent application Ser. No. 12/571,423 for SOFTWARE INVENTORY DERIVATION and filed concurrently herewith, which is incorporated herein by reference for all purposes and U.S. patent application Ser. No. 12/571,432 for FILE VERSION TRACKING VIA SIGNATURE INDICES and filed concurrently herewith, which is incorporated herein by reference for all purposes, and U.S. patent application Ser. No. 12/571,427 for FILE LOCATION TRACKING VIA SIGNATURE INDICES and file concurrently herewith, which is incorporated herein by reference for all purposes.

FIELD OF THE INVENTION

The present invention relates generally to data systems, and more particularly, to systems and methods of efficiently deriving software inventory.

BACKGROUND OF THE INVENTION

Hardware is advancing at an incredible pace. Capacity for personal computers may now be measured in terabytes, random access memory (RAM) may be measured in gigabytes, and processing speeds are well in the gigahertz range—something unimaginable a mere decade ago.

Unfortunately, the processes imposed on hardware are advancing at an incredible pace as well. Today's computers backup more information than computers of the past, search through larger hard drives to look for more sophisticated viruses, and keep track of an ever-expanding list of applications and documents. Whether it is a virus scan, a backup operation, a request for software inventory, the processes imposed on modern hardware are quite demanding. Despite the advances in hardware, these processes may render a computer unusable. There is a need, therefore, for an improved method, article of manufacture, and apparatus for processing information.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
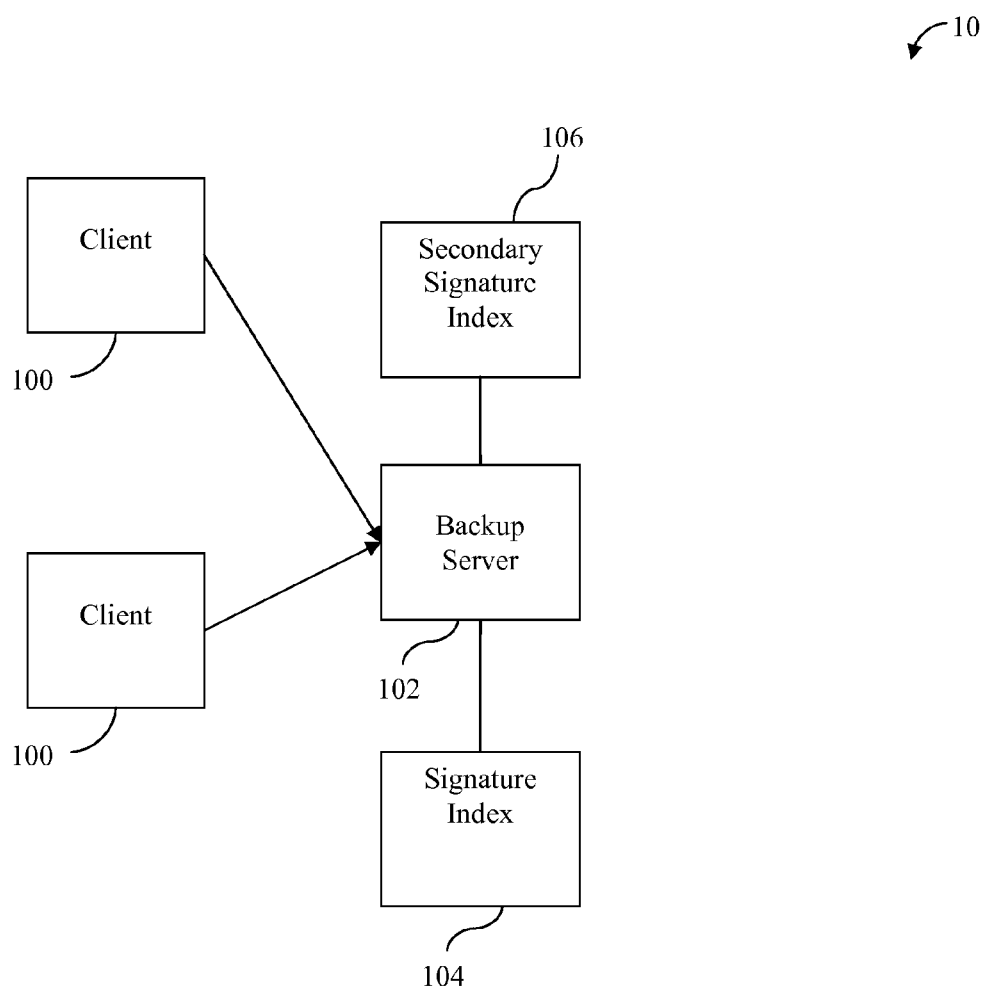
FIG. 1 is a diagram of a system in accordance with one embodiment of the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a backup system configured to store files, but it should be understood that the principles of the invention are not limited to backup systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

In some embodiments, the present invention identifies files by a hash of their contents. These files might contain data, such as documents, price lists, or configuration settings, or the files might contain computer programs such as commercial software applications, in-house developed software applications, or malware such as keyloggers.

Hash functions are commonly used to map a large space to a small one. A hash function processes an input stream of bytes and produces an output hash value, typically of a fixed size, and almost always smaller than the input.

A basic principle of information theory is the pigeonhole principle, which states that if set A contains more values than set B, then for any function that maps A to B there will be members of B that are associated with more than one member of set A.

Obviously, if the size of the hash value is smaller than the size of the input data stream, there are fewer possible hash values than possible data sequences, and thus a finite probability of two files having the same computed hash value. If the output of the hash function is large enough and randomly distributed, this problem does not arise in practice. The likelihood that two different byte sequences will have the same hash value, also known as a collision, can be determined mathematically. If the probability of a collision is vanishingly small, we can have a high level of confidence that each computed hash value is unique, given a finite number of actual input data sequences.

One popular hash function is the Sha1 hash function [13] developed by the US National Institute for Standards and Technology (NIST). Sha1 is a popular hash algorithm for many security systems and, to date, there are no known collisions. The output of Sha1 is a fixed 160 bit (20 byte) hash value. The Sha1 hash function is currently in widespread use for applications such as computing digital signatures of documents, and tamper detection of internet website authentication certificates.

The enhanced techniques described, in some embodiments, make use of a hash function that attempts to generate a unique hash value signature for a collection of files. A user of the system described by this invention might have these files in a single instance or multiple instances of computer readable media.

By using a collision-resistant hash function with a sufficiently large output hash value, it is possible to consider the hash of a file as unique. Such a unique hash will be referred to as the signature of a file.

In some embodiments, a cryptographic hash function is employed. For such a function, it is computationally infeasible to find two distinct inputs that hash to the same value. This property is important because it deters malicious attempts to create files that violate the assumption that each file has a unique fingerprint. The deterrent effect is based on the premise that a collision is computationally infeasible to produce. Most commonly used hash functions, such as the Sha1 hash function, are cryptographic hash functions.

In some embodiments, using the enhanced techniques described herein, a user may efficiently compute the signatures of large collections of files held within a broad expanse of computer readable storage within an enterprise, and to use the derived collection of signatures, along with the time and location of the signatures origin to provide a useful system for tracking the presence and location over time of both information and installed executable software.

In some ways, this invention is comparable to a time lapse photography system, for example the security camera recording system that might be deployed in a casino. However, instead of recording activities related to people, this invention enables the tracking of file creation, modification, deletion, movement and copying across the computer storage within an enterprise. Similar to the way a security camera recorder allows retrospective investigation after an event has occurred, this invention enables previously unfeasible analysis related to historical events that concern executable or data files.

The system is configured to monitor storage at various user selectable locations in an enterprise. The system makes inventory entries for files contained in storage. A inventory entry is comprised of a file's name, location, a signature of its content, and a timestamp indicating when that the catalog entry was made, changed or modified.

In conjunction with these inventory records, the system would also make use of one or more catalogs of known files, based on the signature of the file's content. By comparing a given file's content signature with the entries contained in the system catalogs, the actual identity of a file can be determined, even in the face of attempts to hide file content such as might occur if a person or malware attempts to conceal a file by renaming it.

One example of a useful catalog would be one populated with the hash signature to file description database published by the US National Institute of Standards and Technology. The NSRL database maps SHA-1 hash signatures to popular software.

The NSRL database is described at http://nsrl.nist.gov/Project_Overview.htm. Using a catalog generated from the NSRL database, various reports of known software can be derived. For example, a report on all software installed on specific personal computer may be derived, the total number of copies of a licensed software product deployed in an organized may be derived, or the number of, and specific location of, unpatched or obsolete versions of a software product may be derived.

Disclosed herein are a method and system to efficiently process information. Conventional methods to efficiently process information include deduplication. Deduplication typically involves breaking data into discrete blocks, applying an algorithm to each discrete block to create a corresponding unique signature (hashing the block), associating the unique signature to its respective discrete block, and storing the blocks and signatures. Typically, an index of the unique signatures (a signature index) is created and maintained, so that it may be referenced in the future. For example, when subsequent data is received, deduplication would break the subsequently received data into discrete blocks, hash the discrete blocks to create unique signatures, and associate the signatures to their respective discrete blocks. If a duplicate signature is encountered (e.g. a signature already stored in a signature index), its associated data block need not be stored. An example of a backup application which utilizes deduplication is Avamar, a product available from EMC Corporation.

In some embodiments of the present invention, the signature index created by a backup application may be used for additional processing, as shown in FIG. 1. FIG. 1 illustrates Backup System 10 with Clients 100, Backup Server 102, Signature Index 104, and Secondary Signature Index 106. Backup Server 102 backs up Clients 100 data. Backup Server 102 maintains Signature Index 104, which contains unique signatures created during a deduplication operation. Secondary Signature Index 106 contains unique signatures generated by a reference. The reference may be independent from the backup system. For example, in some embodiments, the reference may be the National Software Reference Library (NSRL), which is supported by the U.S. Department of Justice and the National Institute of Standards and Technology (NIST). Though FIG. 1 shows Signature Index 104 to be separate from Backup Server 104, in some embodiments the signature index may reside inside the backup server. Similarly, in some embodiments, the secondary signature index may be stored inside the backup server. Further, there may be multiple signature indices and multiple secondary signature indices.

One such process may be software inventory derivation. This is typically important in large enterprise environments, where a detailed accounting of all installed software is required to comply with license agreements or other legal restrictions. Conventional methods of software derivation include Microsoft Windows Management Instrumentation (WMI) interface. These methods may be too resource intensive or time consuming. The enhanced techniques described herein utilize a signature index and a secondary signature index to efficiently identify installed software.

Figure 2:
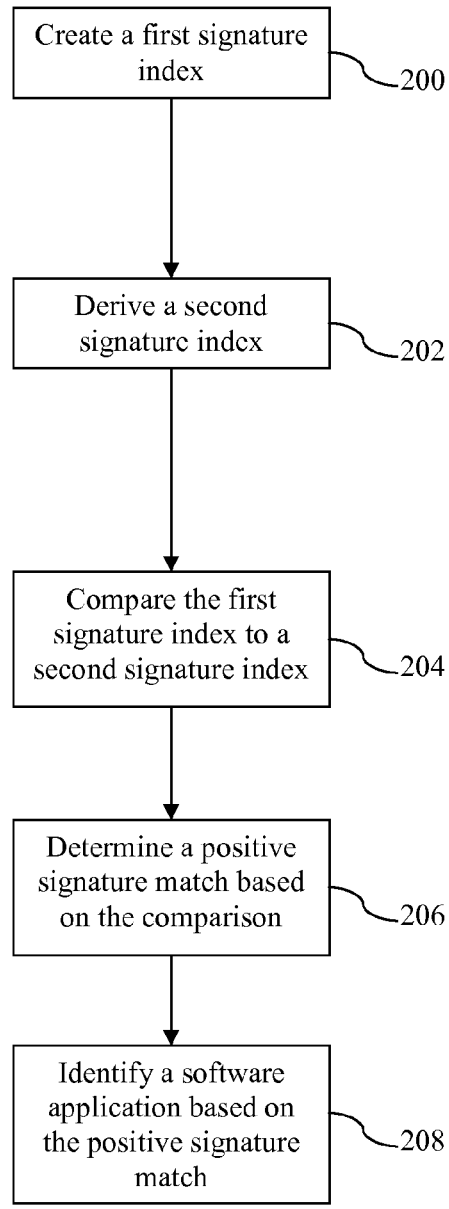
FIG. 2 is a flowchart of a method to process information in accordance with one embodiment of the invention.

FIG. 2 illustrates a method to derive software inventory in accordance with one embodiment of the current invention. In step 200, a first signature index is created. In step 202, a second signature index is derived. In step 204, the first signature index is compared to a second signature index. In step 206, a positive match is determined based on the comparison. In step 208, a software application is identified based on the positive signature match.

A secondary signature index may contain a list of known application signatures. In some embodiments, the secondary signature index may be the NIST NSRL, which contains the signatures for many common software applications. To illustrate, a signature for word processing software MS Word may be "ABC123," and stored in the secondary signature index. If MS Word was installed on a client, a deduplication backup operation of the client may result in a signature "ABC 123" being created, and stored in a signature index. A comparison of the signature index with the secondary signature index would reveal that both indices contain the signature "ABC123." Since the secondary signature index is a reliable index of application signatures, it would be determined that the client has MS Word installed.

The above example assumes that the algorithm used to derive the signature in the secondary signature index will be the same as the algorithm utilized by the deduplication backup operation (e.g. same algorithm used to derive the signature in the signature index). However, there are many backup applications utilizing different algorithms, and many references which utilize different algorithms (e.g. SHA-1, SHA-2, etc.). In cases where the algorithm for the secondary signature index differs from that of the signature index, the backup system may automatically transform one set of signatures to conform the other, or a user may manually transform one set of signatures to conform with the other.

Comparing indices offers many advantages over conventional software inventory derviation. One advantage is the amount of resources required. In some embodiments, the indices are text files, which are relatively small in size and simple to analyze. The comparison of indices requires much less computing power than going through a file system to look for applications. This is especially true in backup systems since the creation of the indices (e.g. signature index created during the usual course of the backup application) is already complete.

Further, comparison of indices may reveal applications that would not be noticed by conventional methods. For example, a typical way to check for installed software is to analyze the Windows registry, Program Files folder, or the Installed Programs feature of the Windows Control Panel, among others. However, analyzing the foregoing would not reveal a .EXE that was located in a random folder. This may be critical in the case where the .EXE was installed by a malicious user or malware. For example, if a well-known harmful program MALWARE.EXE's signature is "FFF000," a user may decide to put "FFF000" in a secondary signature index. If a backup of a client creates a signature index with "FFF000," a comparison of the signature index with the secondary signature index would indicate that the client has a copy of MALWARE.EXE.

Similarly, version tracking of software applications may be accomplished. Following the above example, if "ABC 123" was the signature for Word 2007, and "ABC122" was the signature for Word 2003, it would be determined that the client had the Word 2007 version installed.

Individual file tracking may also be accomplished. For example, it may be desirable to determine if a client has a copy of a sensitive financial report. Public references, such as the NIST NSRL, would most likely not have the signature for sensitive and private files. As such, the secondary signature index may be user-generated. In some embodiments, it may be desirable to use a previous signature index generated by a backup application as a current secondary signature index.

Figure 4:
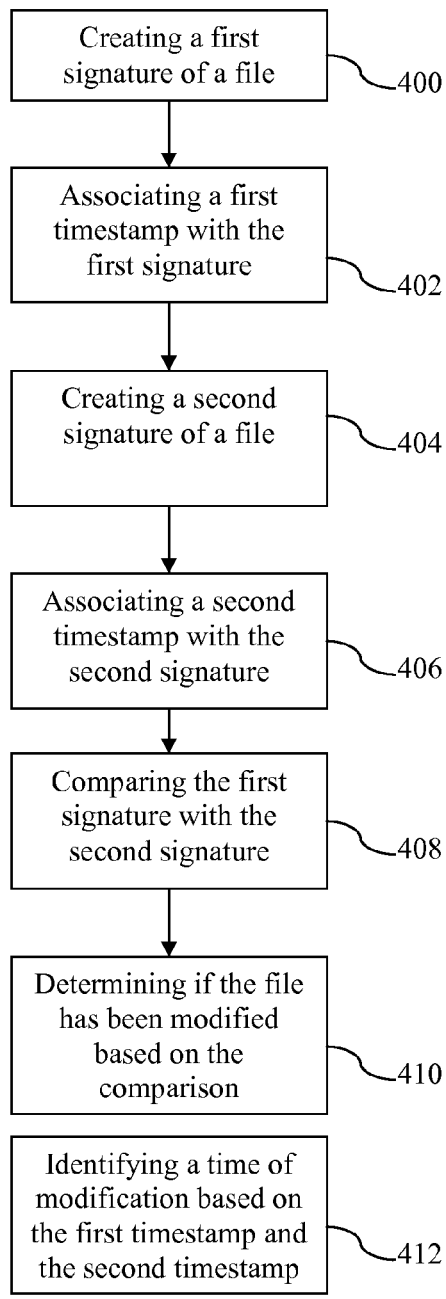
FIG. 4 is a flowchart of a method to track file versions in accordance with one embodiment of the invention.

A method for tracking versions of data in accordance with one embodiment of the current invention is illustrated in FIG. 4. In step 400, a first signature of a file is created. In step 402, a first timestamp is associated with the first signature. In step 404, a second signature of the file is created. In step 406, a second timestamp is associated with the second signature. In step 408, the first signature is compared with the second signature. In step 410, it is determined whether the file has been modified based on the comparison. In step 412, a time of modification is identified based on the first timestamp and the second timestamp.

A time of modification may also be used to identify the earlier version of the file. The earlier version of the file may then be used to replace a later version.

Figure 5:
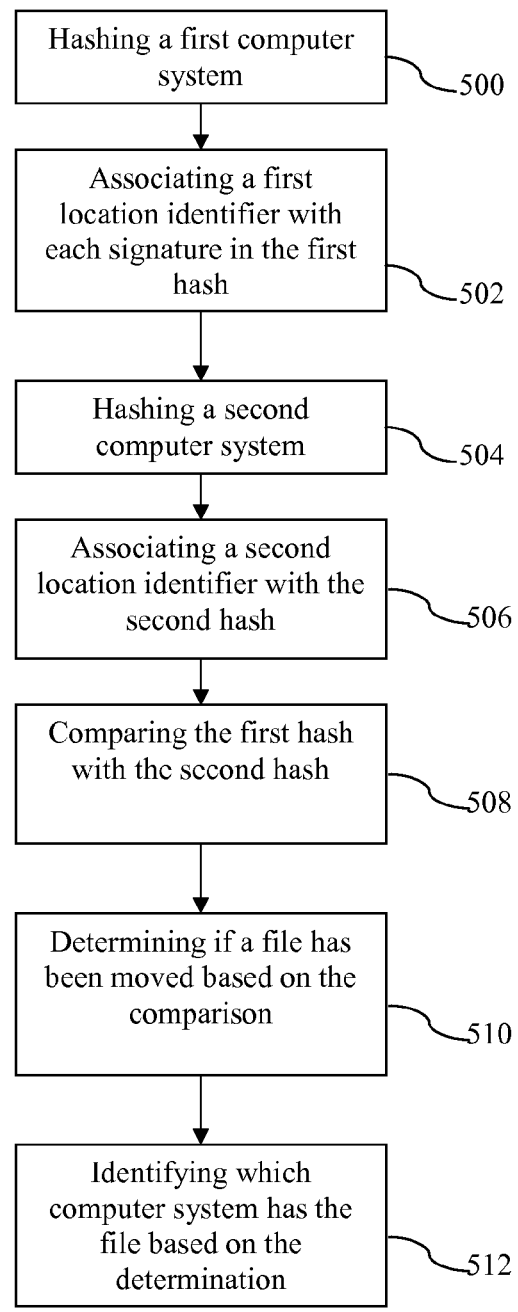
FIG. 5 is a flowchart of a method to track file locations in accordance with one embodiment of the invention.

FIG. 5 illustrates a method to track the location of a file across multiple computer systems in accordance with one embodiment of the current invention. In step 500, a first computer system is hashed. In step 502, a first location identifier is associated with each signature in the first hash. In step 504, a second computer system is hashed. In step 506, a second location identifier is associated with the second hash. In step 508, the first hash is compared to the second hash. In step 510, a file is determined to have been moved based on the comparison. In step 512, a computer system having the file is identified based on the determination.

In this way, the enhanced techniques described herein are comparable to a time lapse photography system, for example, such as the security camera recording system deployed in a casino. Instead of recording activities related to people, this invention enables the tracking of file creation, modification, deletion, movement and copying across the computer storage within an enterprise. Similar to the way a security camera recorder allows retrospective investigation after an event has occurred, this invention enables previously unfeasible analysis related to historical events that concern executable or data files.

In some embodiments, a backup server may serve a plurality of clients. In such embodiments, tracking applications and documents across the plurality of clients is possible. In some embodiments, multiple signature indices may correspond to multiple clients. In some embodiments, a signature index may contain a data field indicating the client. For example, a signature index may be:

Client A|ABC123, 000011
Client B|ABC120, 111100

The first line in the above signature index indicates that Client A has signatures ABC123 and 000011, while Client B has signatures ABC120 and 111100.

A secondary signature index may be:
MS Word 2007|ABC123
MS Word 2003|ABC120
Quarter 3 Financial Report|000011
Quarter 2 Financial Report|111100

The first line in the above secondary signature index indicates that the signature for MS Word 2007 is "ABC123," the signature for MS Word is "ABC120," the signature for the Quarter 3 Financial Report file is "000011," and the signature for the Quarter 2 Financial Report file is "111100."

By comparing the above secondary signature index to the above signature index, it can be determined which client has which version of MS Word, and which client has which version of the Financial Report file.

Secondary signature indices may also be used to assist in virus or malware detection. As discussed above, signatures of well-known harmful programs may be added to a secondary signature index. Thus, in some embodiments, if a comparison between a signature index and the secondary signature index results in a positive match, it can be concluded that a client has a virus or other harmful program.

Figure 3:
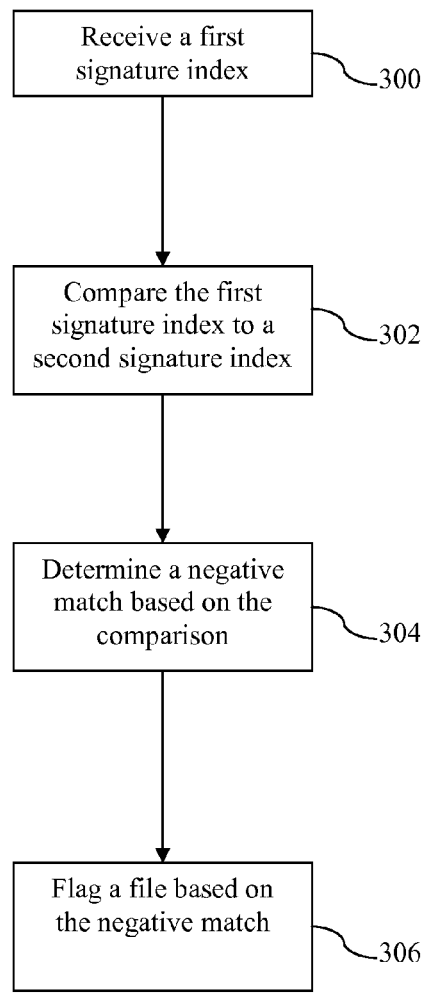
FIG. 3 is a flowchart of a method to process information in accordance with one embodiment of the invention.

FIG. 3 illustrates a method to detect malware in accordance with one embodiment of the current invention. In step 300, a first signature index is received. In step 302, the first signature index is compared to a second signature index. In step 304, a negative match is determined based on the comparison. In step 306, the negative match is used to flag a file.

In some embodiments, if a comparison between a signature index and a secondary signature index results in a negative match, the negative match may be used to assist in virus or malware detection. For example, a clean and virus free MS Word 2007's signature may be "ABC 123." If an office had three computers, each with a copy of MS Word, and a recent backup produced the following signature index:
Client A|ABC123
Client B|ABC123
Client C|EEE111
it can be concluded that Client C has a non-clean version of MS Word. This may indicate that Client C has a virus, has a compromised version of MS Word, or has an undocumented version of MS Word, among others. It may be desirable for a system administrator further investigate Client C based on this information.

The enhanced techniques for virus or malware detection may be combined with the enhanced techniques for tracking to provide a robust solution. For example, if a recent backup operation produced a signature index indicating that multiple clients are infected with a virus, the signature index may be compared to that of a previous signature index produced by a previous backup operation. If the comparison revealed fewer infected clients in the previous signature index, this information could be used to assist in determining which client was infected at which time. This may be potentially valuable to determining the root cause of the virus and ultimately the removal of the virus. Similarly, if there were multiple previous backups, each with progressively fewer infected clients, comparisons between multiple previous signature indices would greatly assist in determining the original infected client.

Though the above has been described with reference to a backup system, it should be appreciated that the present invention need not be limited to such environments. For example, in some embodiments, the present invention may be a stand-alone virus scan application that is capable of generating unique signatures via hashing independent from a backup system.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing information, comprising:
receiving a first signature index comprising a first signature and a location of the signature origin, wherein the first signature index is created by a backup application;
comparing the first signature index to a second signature index;
determining a negative signature match based on the comparison;
flagging a file based on the negative match;
after flagging the file, comparing an earlier version of the first signature index produced during a previous backup by the backup application to the second signature index; and
storing a signature origin time for each version compared in a storage device.

2. The method as recited in claim 1, further comprising quarantining the file.

3. The method as recited in claim 1, wherein the second signature index contains a list of signatures for software applications.

4. The method as recited in claim 1, wherein the second signature index is created by a backup application.

5. A system for processing information, comprising:
a storage device; and
a processor configured to receive a first signature index comprising a first signature and a location of the signature origin, wherein the first signature index is created by a backup application, compare the first signature index to a second signature index, determine a negative signature match based on the comparison, flag a file based on the negative match, after flagging the file, compare an earlier version of the first signature index produced during a previous backup by the backup application to the second signature index, and store a signature origin time for each signature compared in a storage device.

6. A computer program product for processing data, comprising at least one nontransitory processor readable medium having program instructions embodied therein for:
receiving a first signature index comprising a first signature and a location of the signature origin, wherein the first signature index is created by a backup application;
comparing the first signature index to a second signature index;
determining a negative signature match based on the comparison;
flagging a file based on the negative match;
after flagging the file, comparing an earlier version of the first signature index produced during a previous backup by the backup application to the second signature index; and
storing a signature origin time for each signature compared in a storage device.

\* \* \* \* \*